United States Patent
Benson et al.

(10) Patent No.: US 12,346,144 B2
(45) Date of Patent: Jul. 1, 2025

(54) INTEGRATED BRAKE AND ACCELERATOR PEDAL ASSEMBLY

(71) Applicant: Toyota Motor Engineering & Manufacturing North America, Inc., Plano, TX (US)

(72) Inventors: Blaine C. Benson, Ann Arbor, MI (US); Luke W. Garnaut, Ann Arbor, MI (US); Bradley M. Legris, Brighton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/387,609

(22) Filed: Nov. 7, 2023

(65) Prior Publication Data

US 2025/0147537 A1    May 8, 2025

(51) Int. Cl.

| | |
|---|---|
| *G05G 1/30* | (2008.04) |
| *B60K 26/02* | (2006.01) |
| *B60T 7/04* | (2006.01) |
| *G05G 1/38* | (2008.04) |
| *G05G 1/445* | (2008.04) |

(52) U.S. Cl.
CPC ............ *G05G 1/305* (2013.01); *B60K 26/02* (2013.01); *B60T 7/042* (2013.01); *G05G 1/38* (2013.01); *G05G 1/445* (2013.01)

(58) Field of Classification Search
CPC .......... G05G 1/305; G05G 1/38; G05G 1/445; B60K 26/02; B60T 7/042
See application file for complete search history.

(56) References Cited

U.S. PATENT DOCUMENTS

| | | | |
|---|---|---|---|
| 9,501,083 B2 | 11/2016 | Zhou et al. | |
| 10,401,892 B2 * | 9/2019 | Abu Al-Rubb | ........ G05G 1/445 |
| 11,307,605 B2 * | 4/2022 | Neubauer | ................ G05G 1/44 |

FOREIGN PATENT DOCUMENTS

| | | | |
|---|---|---|---|
| CN | 105437969 A | | 3/2016 |
| CN | 111923729 A | | 11/2020 |
| CN | 112009238 A | * | 12/2020 |
| DE | 1948480 A1 | * | 4/1971 |
| JP | 2004352228 A | | 12/2004 |
| KR | 1020130065963 A | | 6/2013 |
| WO | 2016060419 A1 | | 4/2016 |

* cited by examiner

*Primary Examiner* — William C Joyce
(74) *Attorney, Agent, or Firm* — Dinsmore & Shohl LLP

(57) ABSTRACT

A pedal assembly that has a rotation axis is provided. The pedal assembly includes a pedal pad, which includes a first portion positioned on one side of the rotation axis and a second portion positioned on the other side of the rotation axis such that a load applied to the first portion generates a brake command and a load applied to the second portion generates an acceleration command. A neutral position of the pedal pad is configured to be adjusted between an off mode, where the neutral position of the pedal pad is parallel with a floor surface, a first operating mode where the neutral position of the pedal pad is at a first angle with respect to the floor surface, and a second position where the neutral position of the pedal pad is at a second angle with respect to the floor.

10 Claims, 2 Drawing Sheets

INTEGRATED BRAKE AND ACCELERATOR PEDAL ASSEMBLY

TECHNICAL FIELD

Embodiments described herein generally relate to pedal assemblies and, more specifically, to pedal assemblies having a single pedal with pedal control configurations that provide immediate brake feel feedback to a driver.

BACKGROUND

Conventional pedal systems use two independent pedal assemblies, an accelerator pedal assembly and a brake pedal assembly. A driver may be confused and press an incorrect pedal (e.g., confusing the brake pedal for the accelerator pedal). Further, conventional two-pedal mechanisms are complex and require many components.

SUMMARY

In one embodiment, a pedal assembly is provided. The pedal assembly includes a pedal arm and a pedal pad rotatably coupled on the pedal arm about a rotation axis. The pedal pad has a first portion positioned on one side of the rotation axis and a second portion positioned on the other side of the rotation axis such that a load applied to the first portion generates a brake command and a load applied to the second portion generates an acceleration command. A neutral position of the pedal pad is configured to be adjusted between an off mode, a first operating mode and a second operating mode. In the off mode, the neutral position of the pedal pad is parallel with a floor surface. In the first operating mode, the neutral position of the pedal pad is at a first angle with respect to the floor surface, and in the second position, the neutral position of the pedal pad is at a second angle with respect to the floor surface. The second angle is a greater angle than the first angle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein are directed to pedal assemblies that include a single pedal pad, or one-pedal, that is configured to rotate about a rotation axis in one direction for braking and in the opposite direction for acceleration to reduce complexity while providing a mechanism for brake feel feedback to a driver compared to conventional pedal assemblies. As such, a driver may initiate a braking command by applying a load on one side of the pedal with respect to the rotation axis and initiate an acceleration command by applying a load to the other side of the pedal with respect to the rotation axis.

The pedal assembly is configured to provide a braking feedback to the driver by adjusting neutral position of the pedal pad between an off mode, and two operating modes including a first operating mode and a second operating mode. In the off mode, the neutral position of the pedal pad is parallel with a floor surface and there is no haptic feel or instant feedback provided to the driver in this mode. When the pedal assembly is in the first operating mode, the neutral position of the pedal pad is moved to be positioned at a first angle with respect to the floor surface. When the pedal assembly is in the second operating mode, the neutral position of the pedal pad is positioned at a second angle with respect to the floor surface. The second angle in the second operating mode is greater than the first angle in the first operating mode. The adjustment of the pedal pad between the modes provides an instant haptic feel to the driver of the positioning of the pedal pad and assists in providing a braking feedback to the driver.

Further, such an arrangement reduces the amount of parts and mechanisms required compared to conventional two-pedal assemblies. Additionally, such an arrangement prevents conflicting signals (e.g., a braking command and an acceleration command at the same time compared to conventional two-pedal assemblies).

Various embodiments of the pedal assembly for the vehicle will be described in more detail herein.

The phrase "communicatively coupled" is used herein to describe the interconnectivity of various components of the example pedal assembly means that the components are connected either through wires, optical fibers, or wirelessly such that electrical, optical, and/or electromagnetic signals may be exchanged between the components. It should be understood that other means of connecting the various components of the example pedal assembly not specifically described herein are included without departing from the scope of the present disclosure.

Figure 1:
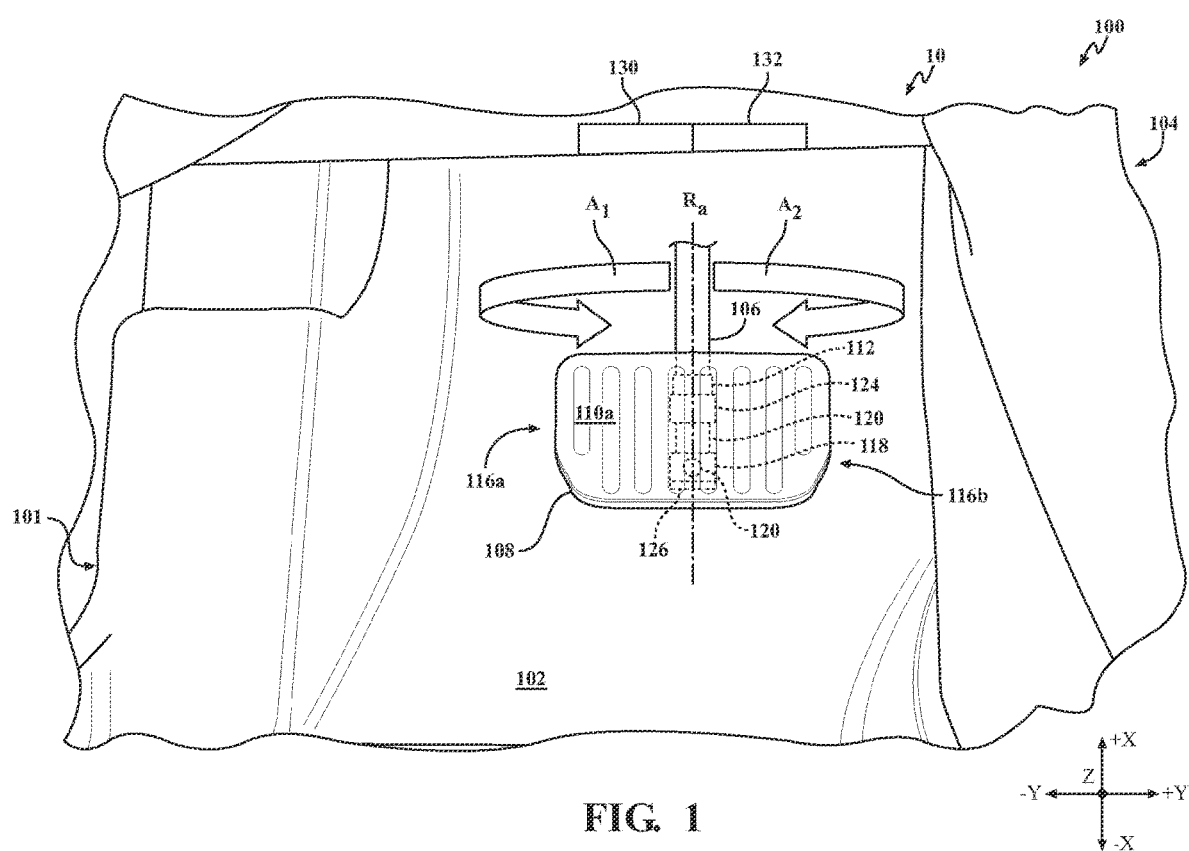
FIG. 1 schematically depicts an example environmental view of an example pedal assembly according to one or more embodiments described herein.

As used herein, the term "longitudinal direction" refers to a front-rear direction of the vehicle (i.e., in a +/−X direction of the coordinate axes depicted in FIG. 1). The term "lateral direction" refers to the lateral width direction of the vehicle (i.e., in a +/−Y direction of the coordinate axes depicted in FIG. 1 depicted in FIG. 1), and is transverse to the longitudinal direction. The term "vertical direction" refers to the upward-downward direction of the vehicle (i.e., in the +/−Z direction of the coordinate axes depicted in FIG. 1).

Referring now to the drawings, FIG. 1 schematically depicts an example vehicle 10 having a pedal assembly 100 positioned within a driver's well 101 of a passenger compartment 104. The pedal assembly 100 is spaced apart from a floor 102 of the driver's well 101. It should be appreciated that the example vehicle 10 described herein may be an automobile, a truck, a sports utility vehicle, an all-terrain vehicle, an off-road vehicle, and/or the like. Further, the example vehicle 10 described herein may include an internal combustion engine and the associated powertrain components, a diesel engine and the associated powertrain components, may be semi-autonomous, fully autonomous, a hybrid vehicle and the like.

The example pedal assembly 100 may be a hanging-type pedal assembly, as in the depicted embodiments, a floor mounted-type pedal assembly, or the like. The example pedal assembly 100 may include a pedal arm 106 with a pedal pad 108 moveably coupled theretho. The pedal pad 108 is a single pad configured to allow the driver to input both braking and acceleration operations. As such, a single pad is configured to be actuated for both acceleration and braking commands as required by the driver. The pedal pad 108 has an exterior surface 110a and an opposite interior surface 110b, as shown in FIGS. 2A-3B. The exterior surface 110a faces the driver while the interior surface 110b faces the floor 102.

Referring now to FIGS. 2A-2B and 3A-3B, in some embodiments, an attachment member 112 extends from the interior surface 110b. The attachment member 112 may include a connector 114a extending downward in the vertical direction (i.e., in the +/−Z direction) from the interior surface 110b and an aperture 114b that is formed in the connector 114a. In embodiments, the pedal arm 106 is at least partially received within the aperture 114b of the connector 114a. In some embodiments, the attachment member 112 is configured to movably couple the pedal pad 108 to the pedal arm 106. As such, in these embodiments, the attachment member 112 may be a swivel, spindle, pivot, and the like to permit the pedal pad 108 to move relative to the pedal arm 106 about a rotation axis, illustrated by arrow Ra in FIG. 1. In other embodiments, the attachment member 112 is configured to fixedly couple the pedal pad 108 to the pedal arm 106. In this embodiment, the pedal arm 106 may be moveably coupled to another component such that the pedal arm 106 may move or pivot the pedal pad 108 relative to the coupling of the other component about the rotation axis, illustrated by arrow Ra in FIG. 1.

Referring back now to FIG. 1 and still referring to FIGS. 2A-2B and 3A-3B, in some embodiments, the attachment member 112 may be coupled to a proximal end of the pedal arm 106 via a fastener. Example fasteners may include, without limitation, a bolt and nut, rivet, screw, weld, adhesive, epoxy, and/or the like. In other embodiments, the pedal arm 106 and the attachment member 112 may be integrally formed as a single monolithic structure that may be formed using injection molding techniques, three-dimensional printing techniques, and the like.

In some embodiments, the attachment member 112 may be integrally formed with the interior surface 110b of the pedal pad 108 to be a single, monolithic structure with the pedal pad 108. In other embodiments, the attachment member 112 may also be a separate component that is coupled to the interior surface 110b via a fastener, such as, without limitation, bolt and nut, screw, rivet, adhesive, epoxy, weld, and/or the like.

Figure 3A:
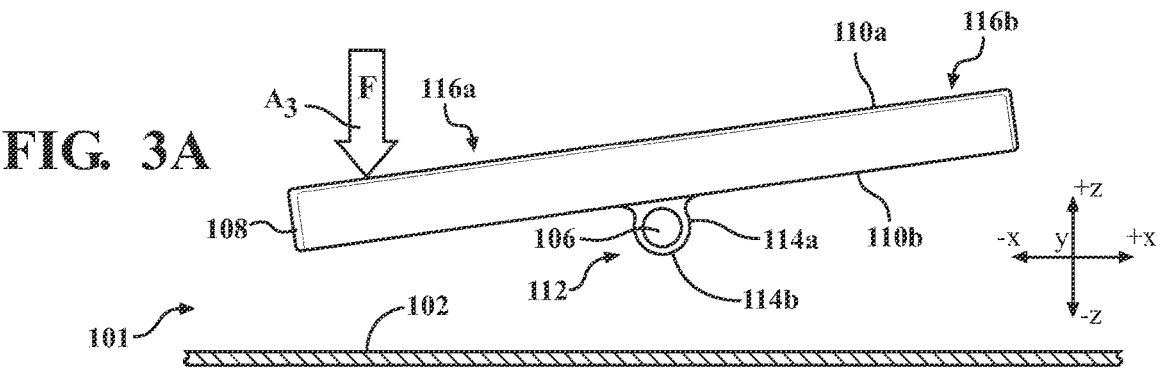
FIG. 3A schematically depicts the example pedal assembly in the first operating mode of FIG. 2A with a load applied to the pedal pad according to one or more embodiments described herein.
Figure 3B:
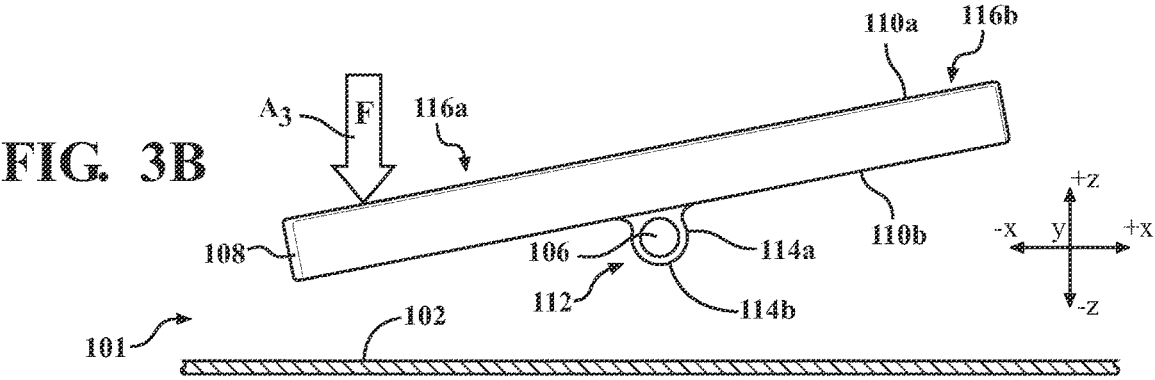
FIG. 3B schematically depicts the example pedal assembly in the second operating mode of FIG. 2B with a load applied to the pedal pad according to one or more embodiments described herein.

The exterior surface 110a of the pedal pad 108 faces the driver and is configured to receive a load or force applied thereon, illustrated by arrow A3 in FIGS. 3A-3B. It is appreciated that the force may be applied to the exterior surface 110a of the pedal pad 108 on either side of the rotation axis Ra. In some embodiments, the exterior surface 110a may be pad or texture surface to provide traction to a foot of a driver. Non-limiting examples include rubber, composites, plastics, and/or the like. In other embodiments, the exterior surface 110a may be defined by a covering applied to the pedal pad 108. Non-limiting examples of the covering may include rubber, composites, plastics, and/or the like.

The pedal pad 108 may further include a first portion 116a positioned on one side of the rotation axis Ra and a second portion 116b positioned on the other side of the rotation axis Ra. It should be appreciated that the pedal pad 108 in a unitary member that has portions virtually separated by the rotation axis Ra such that when the load (e.g., arrow A3) is applied to one side, the pedal pad 108 will pivot, rotate, or otherwise move in that direction about the rotation axis Ra. As such, when the load (e.g., arrow A3) is applied to the other side, the pedal pad 108 will pivot, rotate, or otherwise move in that direction about the rotation axis Ra. Further, the example pedal assembly 100 may include at least one biasing member 126, such as spring, foam, elastomer, and the like, to provide a return force to the pedal pad 108 to position the pedal pad 108 into or at a predetermined neutral position when there is not a load applied onto the pedal pad 108, as discussed in greater detail herein.

Various pedal commands or operations may be initiated based on where the load is applied to the pedal pad 108 and the subsequent amount of rotation of the pedal pad 108 about the rotation axis Ra. In a non-limiting example, when the load (e.g., arrow A3) is applied to the first portion 116a of the pedal pad 108, the pedal pad 108 may rotate in the direction of rotation arrow A1. In response, a brake command may be initiated by a sensor assembly 118 based on the amount of the load applied to the pedal pad 108, which may be sensed as a measurement of the amount of rotation of the first portion 116a about the rotation axis Ra in the direction of rotation arrow A1. In another non-limiting example, when the load is applied to the second portion 116b of the pedal pad 108, the pedal pad 108 may rotate in the direction of rotation arrow A2. In response, an acceleration command may be initiated by the sensor assembly 118 based on the amount of the load applied to the pedal pad 108, which may be sensed as a measurement of the amount of rotation of the second portion 116b about the rotation axis Ra in the direction of rotation arrow A2.

It should be understood that the embodiments described herein of the pedal assembly 100 are directed to a brake-by-wire system that uses an electronic control device 122 (hereinafter, referred to as ECU) to control driving, based on an output signal from at least one sensor 120 of the sensor assembly 118 that detects a stroke amount of the pedal pad 108, illustrated herein as the amount of rotation or movement of the pedal pad 108 about the rotation axis Ra dependent on the amount of load applied to the first portion 116a or the second portion 116b of the pedal pad 108, illustrated by rotation arrow A1 for the braking command and rotation arrow A2 for the acceleration command. As such, the ECU 122 directs or issues braking commands or acceleration commands based on the amount of sensed rotation in the direction illustrated by the rotation arrow A1 or the amount of sensed rotation in the direction illustrated by the rotation arrow A2 about the rotation axis Ra. In some embodiments, the communication from the various components of the pedal assembly 100 to the ECU 122 is via wireless communication protocols. In other embodiments the communication from the various components of the pedal assembly 100 to the ECU 122 is via wired communication protocols and/or a combination of wired and wireless communication protocols.

As such, in some embodiments, the rotation, pivoting, or other movement of the pedal pad 108 about the rotation axis Ra may be in a horizontal direction relative to the pedal arm 106 about the rotation axis Ra. That is, the rotation, pivoting, or other movement of the pedal pad 108 about the rotation axis Ra may be in the lateral direction (i.e., in the +/−Y direction).

The sensor assembly 118 includes the at least one sensor 120 that may be configured to detect an amount of rotation of the pedal pad 108, which may be indicative of the amount of force or load applied by the driver to either the first portion 116a or the second portion 116b of the pedal pad 108, depicted by rotation arrows A1 and A2 depicted in FIG. 1. The at least one sensor 120 may be one or more of a contact sensor, capacitive sensor, infrared (IR) sensor, proximately sensor, angular sensor, and sensor in general configured to detect rotation of the pedal pad 108 about the rotation axis Ra.

The ECU 122 may provide acceleration commands or signals and braking commands or signals based on an output signal from the at least one sensor 120 indicative of the desire of the driver. The ECU 122 may be configured to provide a signal to other vehicle components, and may be configured to receive, analyze and process sensor data, perform calculations and mathematical functions, convert data, generate data, control vehicle system components (e.g., transmit brake commands, acceleration commands), and the like. The ECU 122 may include one or more processors, and other components, for example one or more memory modules that stores logic that is executable by the one or more processors. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, and the like, that may be compiled or assembled into computer-executable instructions and storage on the one or more memory modules. Alternatively, the computer-executable instructions may be written in hardware description language, such as logic implemented via either a field programmable gate array (FPGA) configuration or an application specific integrated circuit (ASIC), all their equivalents. Accordingly, the systems, methods and/or processes described herein may be implemented in any conventional computer programming language, as preprogrammed hardware elements, or as a combination of hardware and software components.

When the pedal pad 108 is rotated in the direction indicated by rotation arrow A1 as a result of the force or load applied to the exterior surface 110a of the pedal pad 108 at the first portion 116a by the driver, the at least one sensor 120 may detect or otherwise sense the movement and provide data signals to the ECU 122, which in turn may determine or calculate the amount of braking command to output to a braking mechanism 130, such as a brake cylinder. The braking mechanism 130 may react based on the braking command.

When the pedal pad 108 is rotated in the direction indicated by rotation arrow A2 as a result of the force or load applied to the exterior surface 110a of the pedal pad 108 at the second portion 116b by the driver, the at least one sensor 120 may detect or otherwise sense the movement and provide data signals to the ECU 122, which in turn may determine or calculate the amount of acceleration command to output a drive mechanism 132, such as an engine or a motor. The drive mechanism 132 may react based on the acceleration command Such a configuration permits for the various amounts of rotation, pivot, or movement of the pedal pad 108 in either lateral direction (i.e., in the +/−Y direction) about the rotation axis Ra such that a plurality of different acceleration commands and/or braking commands may be issued. For example, the driver may only apply a slight force over a long period of time onto the second portion 116b of the pedal pad 108 to rotate the pedal pad 108 in the direction indicated by rotation arrow A2 about the rotation axis Ra. In response to this movement of the pedal pad 108 sensed by the at least one sensor 120, the ECU 122 may transmit acceleration commands that are in line with a gradual increase in acceleration. In another non-limiting example, the driver may apply a heavy force over a very short period of time onto the first portion 116a of the pedal pad 108 to rotate the pedal pad 108 in the direction indicated by rotation arrow A1 about the rotation axis Ra. In response to this movement of the pedal pad 108 sensed by the at least one sensor 120, the ECU 122 may transmit immediate brake commands that are in line with an emergency braking request.

Still referring to FIGS. 1-3B, the example pedal assembly 100 may further include an actuator 124 that is configured to rotate the pedal pad 108 from the predetermined neutral position into different initial predetermined neutral positions based on an operating mode, discussed in greater detail herein. The predetermined neutral position may be a position where the exterior surface 110a of the pedal pad 108 is generally presented to the driver in a planer orientation where the interior surface 110b may be generally parallel to the floor 102 of the driver's well 101 such that both the first portion 116a and the second portion 116b are an equal distance DO from the floor 102 of the driver's well 101, illustrated in phantom best in FIG. 2A. Further, in some embodiments, the predetermined neutral position may be achieved by the return force acting onto the pedal pad 108 from the at least one compression member, such as coil spring, foam, elastomer, and the like. As such, the at least one compression member may apply a load onto the pedal pad 108 in a direction opposite of the load applied to the exterior surface 110a of the pedal pad 108 by the force from the driver.

In other embodiments, the actuator 124 may assist in combination with the at least one biasing member 126 and/or the actuator 124 may be independent configured to move the pedal pad 108 to the predetermined neutral position when there is not a load or force applied onto the exterior surface 110a of the pedal pad 108. As such, the actuator 124 may apply a load onto the pedal pad 108 in a direction opposite of the load applied to the exterior surface 110a of the pedal pad 108 by the force from the driver.

The actuator 124 may be electric driven, hydraulic driven, pneumatic driven, piezoelectric, and/or the like. Further, the actuator 124 may be a linear type, a rotary type, and/or the like. Further, the actuator 124 may be communicatively coupled to the ECU 122 of the example pedal assembly 100. As such, the ECU 122 may provide commands to the actuator 124 to initiate movement of the actuator 124, which in turn moves the pedal pad 108 either in a return direction or between the different predetermined neutral positions based on the operating mode, as discussed in greater detail herein.

Still referring to FIGS. 1-3B, the pedal pad 108 is configured to adjust or move between the off mode, the first operating mode, and the second operating mode. The off mode is where the neutral position of the pedal pad 108 is at the predetermined neutral position, as discussed in detail above and as best illustrated in phantom in FIG. 2A. The predetermined neutral position is the initial position or home position in which the neutral position of the pedal pad 108 is positioned to have a less or smaller angle with respect to the floor 102 than the first angle in the first operating mode.

Figure 2A:
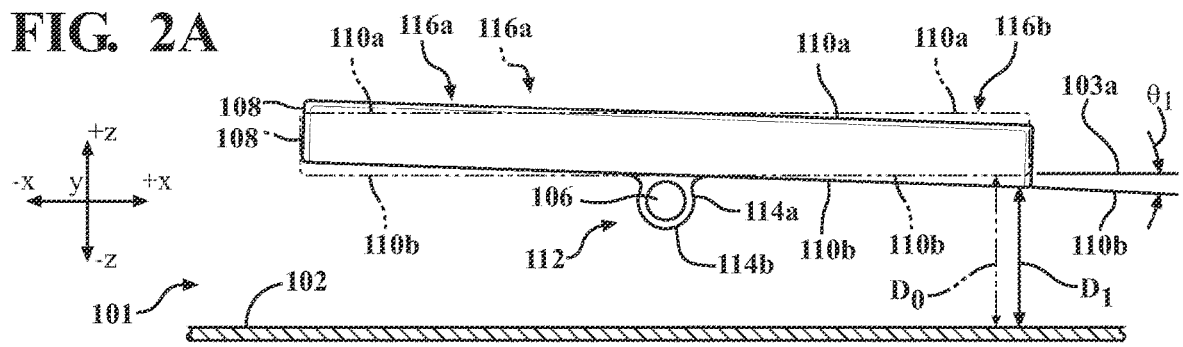
FIG. 2A schematically depicts a side view of the example pedal assembly of FIG. 1 with a pedal pad positioned at a predetermined neutral position illustrated in phantom and the pedal pad positioned at a first predetermined neutral position in a first operating mode according to one or more embodiments described herein.

In the first operating mode, depicted best in FIGS. 2A and 3A, the neutral position of the pedal pad 108 is adjusted to be in a first predetermined neutral position, which is at a first angle θ1 with respect to an imaginary floor surface 103a extending along a same plane as the floor 102 and the interior surface 110b of the second portion 116b of the pedal pad 108, as depicted in FIG. 2A. In this embodiment, the first angle θ1 is illustrated with respect to a lower vertical side of the imaginary floor surface 103a (i.e., in the −Z direction of the coordinate axes depicted in FIG. 1). When the pedal pad 108 is at the first predetermined neutral position, the pedal pad 108 is positioned or rotated by the actuator 124 into the first predetermined neutral position, at the first angle θ1, such that the interior surface 110b of the second portion 116b of the pedal pad 108 is positioned to be closer to the floor 102 than the interior surface 110b of the first portion 116a of the pedal pad 108, depicted by a first distance D1 in FIG. 2A. As such, the pedal pad 108 is rotated by the actuator 124 in the direction of rotation arrow A2 into the first predetermined neutral position to angle the pedal pad 108 such that the second portion 116b of the pedal pad 108 may be a greater distance from the driver and the first portion 116a of the pedal pad 108 may now be closer to the driver.

Such an arrangement provides the driver with an instant feedback based on feel, which side of the example pedal assembly 100 is the braking command side and which is the acceleration command side. That is, the first predetermined position neutral provides the driver with a first braking feedback based on the positioning of the pedal pad 108 in the first operating mode. In a non-limiting example, the first angle θ1 may be a range between 5 degrees and 15 degrees. It should be understood that the first angle θ1 may be less than 5 degrees and/or greater than 15 degrees.

It should also be appreciated that, in other embodiments, the pedal pad 108 may be positioned or rotated by the actuator 124 in the direction of rotation arrow A1 into an inverse position such that the interior surface 110b of the first portion 116a of the pedal pad 108 is positioned to be closer to the floor 102 than the interior surface 110b of the second portion 116b of the pedal pad 108 (e.g., the first portion 116a of the pedal pad 108 may be a greater distance from the driver and the second portion 116b of the pedal pad 108 may now be closer to the driver). In this embodiment, the first angle θ1 may be with respect to an upper vertical side of the imaginary plane of the imaginary floor surface 103a (i.e., in the +Z direction of the coordinate axes depicted in FIG. 1). Such an arrangement may still provide the driver with an instant feedback based on feel, which side of the example pedal assembly 100 is the braking command side and which is the acceleration command side.

Any load applied to the pedal pad 108 while in the first operating mode is sensed by the at least one sensor 120 and transmitted to the ECU 122, which is configured to account for the first predetermined neutral position as the initial starting position, and provide the braking commands and/or acceleration commands, as requested by the amount of the force applied to the exterior surface 110a of the pedal pad 108. As such, the example pedal assembly 100 operates within compensated parameters to output the desired outputs requested by the driver identical to those when the example pedal assembly 100 is in the off mode and the pedal pad 108 is in the predetermined neutral position.

Figure 2B:
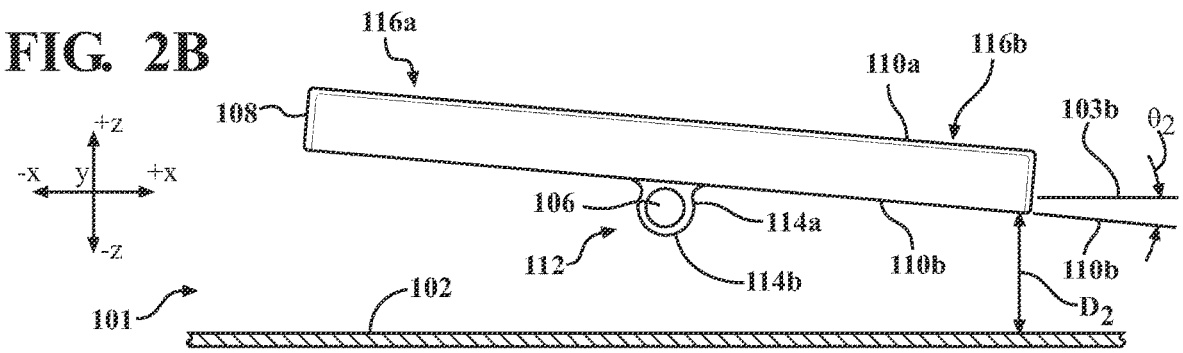
FIG. 2B schematically depicts a side view of the example pedal assembly of FIG. 1 with the pedal pad positioned at a second predetermined neutral position in a second operating mode according to one or more embodiments described herein.

In the second operating mode, depicted best in FIGS. 2B and 3B, the neutral position of the pedal pad 108 is adjusted to be in a second predetermined neutral position, which is at a second angle θ2 with respect to an imaginary floor surface 103b extending along a same plane as the floor 102 and the imaginary floor surface 103a and the interior surface 110b of the second portion 116b of the pedal pad 108, as depicted in FIG. 2B. In this embodiment, the second angle θ2 is illustrated with respect to a lower vertical side of the imaginary floor surface 103b (i.e., in the −Z direction of the coordinate axes depicted in FIG. 1). When the pedal pad 108 is at the second predetermined neutral position, the pedal pad 108 is positioned or rotated by the actuator 124 into the second predetermined neutral position, at the second angle θ2, As illustrated, the second angle θ2 is a larger angle compared to the first angle θ1 such that the distance D2 between the floor 102 and the interior surface 110b of the second portion 116b is closer compared to the distance D1 when the example pedal assembly 100 is in the first operating mode. As such, the distance D1 is a larger or greater distance between the interior surface 110b of the second portion 116b and the floor 102 than the second distance D2 is between the interior surface 110b of the second portion 116b and the floor 102.

Therefore, the pedal pad 108 is rotated by the actuator 124 in the direction of arrow A2 into the second predetermined neutral position such that the interior surface 110b of the second portion 116b of the pedal pad 108 is positioned to be even closer to the floor 102 than the interior surface 110b of the first portion 116a of the pedal pad 108 compared to the distance D1 between the second portion 116b and the floor 102 when in the first operating mode. As such, in the second predetermined neutral position, the pedal pad 108 is at a greater or larger angle compared to the first predetermined neutral position such that the second portion 116b of the pedal pad 108 may be even a greater or longer distance from the driver and the first portion 116a of the pedal pad 108 may now be even closer to the driver compared to the positioning of the first portion 116a and the second portion 116b in the first operating mode.

Such an arrangement provides the driver with more or a greater braking feedback or a greater haptic feedback feel due to the larger angle compared to the braking feedback or haptic feedback feel in the first operating mode and at the first predetermined neutral position. That is, the second operating mode provides the driver with a second braking feedback based on the positioning of the pedal pad 108, which is at a greater angle and a greater second braking feedback compared to the first braking feedback of the first operating mode. In a non-limiting example, the second angle θ2 may be a range between 16 degrees and 30 degrees. It should be understood that the second angle θ2 may be less than 16 degrees and/or greater than 30 degrees.

It should also be appreciated that, in other embodiments, the pedal pad 108 may be positioned or rotated by the actuator 124 in the direction of rotation arrow A1 into an inverse position such that the interior surface 110b of the first portion 116a of the pedal pad 108 is positioned to be closer to the floor 102 than the interior surface 110b of the second portion 116b of the pedal pad 108 (e.g., the first portion 116a of the pedal pad 108 may be a greater distance from the driver and the second portion 116b of the pedal pad 108 may now be closer to the driver). In this embodiment, the second angle θ2 may be with respect to a lower vertical side of the imaginary plane of the imaginary floor surface 103b (i.e., in the +Z direction of the coordinate axes depicted in FIG. 1). Such an arrangement may still provide the driver with an instant feedback based on feel, which side of the example pedal assembly 100 is the braking command side and which is the acceleration command side.

Any load applied to the pedal pad 108 while in the second operating mode is sensed by the at least one sensor 120 and transmitted to the ECU 122, which is configured to account for the second predetermined neutral position as the initial starting position, and provide the braking commands and/or acceleration commands, as requested by the amount of the force applied to the exterior surface 110a of the pedal pad 108. As such, the example pedal assembly 100 operates within compensated parameters to output the desired outputs requested by the driver the identical to those when the example pedal assembly 100 is in the off mode and the pedal pad 108 is in the predetermined neutral position and/or when the example pedal assembly 100 is in the first operating mode and the pedal pad 108 is in the first predetermined neutral position.

The first predetermined neutral position and the second predetermined neutral position provide a sense of feel (e.g., haptic feel) to the driver as to which way the pedal pad 108 should receive a load to indicate a desire to brake and/or to accelerate. Further, the arrangement of the pedal pad 108 eliminates any ability for the driver to request both a brake command and an acceleration command at the same time, or simultaneously. That is, the brake command and the acceleration command cannot be activated simultaneously by the driver. As such, this arrangement may prevent misstep by the driver (e.g., stepping on the accelerator but meaning to brake, and vice versa).

It should now be understood that the pedal assemblies described herein provide include a single pedal pad, or one-pedal, that is configured to rotate about a rotation axis in one direction for braking and in the opposite direction for acceleration to reduce complexity while providing a mechanism for brake feel feedback to a driver compared to conventional pedal assemblies.

Embodiments herein provide various modes, which change an angle of the pedal pad with respect to a floor surface, to increase or change a haptic feel by the driver. Thus, embodiments provide a braking feedback to the driver by adjusting neutral position of the pedal pad between two operating modes, a first operating mode and a second operating mode where the neutral position (idle position) of the pedal pad is different between the modes to provide an instant haptic feel to the driver of the positioning of the pedal pad and assists in providing a braking feedback to the driver.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

The invention claimed is:

1. A pedal assembly comprising:
   a pedal arm;
   a pedal pad rotatably coupled on the pedal arm about a rotation axis, the pedal pad having a first portion positioned on one side of the rotation axis and a second portion positioned on the other side of the rotation axis such that a load applied to the first portion generates a brake command and a load applied to the second portion generates an acceleration command,
   wherein a neutral position of the pedal pad is configured to be adjusted between an off mode, a first operating mode and a second operating mode, in the off mode, the neutral position of the pedal pad is parallel with a floor surface, in the first operating mode, the neutral position of the pedal pad is at a first angle with respect to the floor surface, and in the second operating mode, the neutral position of the pedal pad is at a second angle with respect to the floor surface, the second angle is a greater angle than the first angle, when the pedal pad is in the first operating mode, the first angle provides a first braking feedback to a driver and when the pedal pad is in the second operating mode, the second angle provides a second braking feedback to the driver, the second braking feedback is a greater haptic of brake feel to the driver than the first braking feedback.

2. The pedal assembly of claim 1, wherein the pedal pad is configured to rotate relative to the rotation axis dependent on the load applied to either the first portion or the second portion.

3. The pedal assembly of claim 2, wherein the pedal pad is configured to rotate in a horizontal direction relative to the pedal arm about the rotation axis.

4. The pedal assembly of claim 1, wherein when the pedal pad includes a surface to receive the load applied by a driver.

5. The pedal assembly of claim 1, further comprising:
   a sensor assembly configured to detect an amount of the load applied to the first portion or to the second portion based on an amount of rotation of the first portion or the second portion relative to the rotation axis.

6. The pedal assembly of claim 5, wherein the brake command and the acceleration command are independent signals that cannot be activated simultaneously.

7. The pedal assembly of claim 1, further comprising:
   an attachment member extending from an interior surface of the pedal pad and configured to movably couple the pedal pad to the pedal arm.

8. The pedal assembly of claim 7, wherein the attachment member comprises:
   a connector extending in a vertical direction from the interior surface of the pedal pad; and
   an aperture positioned within the connector.

9. The pedal assembly of claim 8, wherein the aperture extends in a lateral direction to be transverse to a direction that the connector extends from the interior surface of the pedal pad.

10. The pedal assembly of claim 8, wherein the attachment member is integrally formed with the interior surface of the pedal pad.

\* \* \* \* \*

UNITED STATES PATENT AND TRADEMARK OFFICE
CERTIFICATE OF CORRECTION

Page 1 of 1

PATENT NO. : 12,346,144 B2
APPLICATION NO. : 18/387609
DATED : July 1, 2025
INVENTOR(S) : Blaine C. Benson, Luke W. Garnaut and Bradley M. Legris It is certified that error appears in the above-identified patent and that said Letters Patent is hereby corrected as shown below:

On the Title Page

Item (73), assignee 2, city, delete "Toyota" and insert --Toyota-shi Aichi-ken--, therefor.

In the Specification

In Column 3, Line(s) 18, delete "theretho" and insert --thereto--, therefor.

In Column 4, Line(s) 15, after "108", delete "in" and insert --is--, therefor.

In Column 5, Line(s) 20 & 21, delete "proximately" and insert --proximity--, therefor.

In Column 6, Line(s) 13, after "command", insert --.--.

In Column 9, Line(s) 27, after "driver", delete "the".

Signed and Sealed this
Second Day of September, 2025

Coke Morgan Stewart
*Acting Director of the United States Patent and Trademark Office*